United States Patent
Ngo et al.

(10) Patent No.: US 12,007,833 B2
(45) Date of Patent: Jun. 11, 2024

(54) ADJUSTING ERROR RECOVERY PROCEDURE (ERP) IN DATA DRIVE BASED ON HISTORICAL ERP INFORMATION

(71) Applicant: International Business Machines Corporation, Armonk, NY (US)

(72) Inventors: Khanh Vi Ngo, Tucson, AZ (US); Said Ahmad, Tucson, AZ (US); Illarion Borisevich, Tucson, AZ (US); David Lee Swanson, Tucson, AZ (US); Pamela Ruth Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/875,276

(22) Filed: Jul. 27, 2022

(65) Prior Publication Data
US 2024/0036966 A1    Feb. 1, 2024

(51) Int. Cl.
*G06F 11/00*     (2006.01)
*G06F 11/07*     (2006.01)

(52) U.S. Cl.
CPC ...... *G06F 11/0793* (2013.01); *G06F 11/0727* (2013.01)

(58) Field of Classification Search
CPC ........................ G06F 11/0727; G06F 11/0793
See application file for complete search history.

(56) References Cited

U.S. PATENT DOCUMENTS

| | | | | |
|---|---|---|---|---|
| 5,570,242 | A | * 10/1996 | Leonhardt | G11B 20/1833 360/48 |
| 6,023,709 | A | * 2/2000 | Anglin | G06F 11/0727 |
| 8,009,539 | B2 | 8/2011 | Haustein et al. | |
| 8,849,782 | B2 | 9/2014 | Black, III et al. | |
| 9,053,748 | B2 | 6/2015 | Katagiri et al. | |
| 10,067,700 | B2 | 9/2018 | Hasegawa et al. | |
| 10,223,224 | B1 | * 3/2019 | Hickey | G06F 11/2221 |
| 2004/0081082 | A1 | * 4/2004 | Moody, II | G06F 11/2007 370/242 |
| 2009/0089628 | A1 | * 4/2009 | Day | G06F 11/0727 714/54 |
| 2012/0204060 | A1 | * 8/2012 | Swift | G06F 11/1435 714/15 |
| 2013/0094105 | A1 | * 4/2013 | Nylander-Hill | G11B 20/18 |

(Continued)

OTHER PUBLICATIONS

Hazen et al., "MIR Performance Analysis," Lawrence Berkeley National Laboratory, 2012, 10 pages, retrieved from https://escholarship.org/uc/item/5wp6d6rd.

(Continued)

*Primary Examiner* — Joshua P Lottich
(74) *Attorney, Agent, or Firm* — Zilka-Kotab, P.C.

(57) ABSTRACT

In one general embodiment, a method for selecting parameters of an error recovery procedure includes detecting an error during performance of a data operation on a data storage medium by an apparatus. In response to detecting the error, parameters of an error recovery procedure are selected based at least in part on: (a) first information about previous interactions between the apparatus and multiple data storage media, and (b) second information about previous interactions between the data storage medium and other apparatuses.

20 Claims, 14 Drawing Sheets

(56) References Cited

U.S. PATENT DOCUMENTS

| | | | |
|---|---|---|---|
| 2013/0166945 A1* | 6/2013 | Nakao | G06F 11/1088 |
| | | | 714/6.21 |
| 2013/0258516 A1* | 10/2013 | Katagiri | G11B 15/442 |
| 2014/0136918 A1 | 5/2014 | Katagiri et al. | |
| 2016/0335166 A1* | 11/2016 | George | G06F 3/0647 |
| 2021/0255811 A1 | 8/2021 | Ahmad et al. | |

OTHER PUBLICATIONS

Laskaridis et al., "Tape SCSI monitoring and encryption at CERN," IOP Journal of Physics: Conference Series, vol. 898, 2017, pp. 1-8.

Hill et al., "Hardware and Volume Statistical Analysis and Reporting System for Detecting and Isolating Media and Hardware Errors on the Magstar Family of Tape Drives," IP.com Prior Art Database, Technical Disclosure No. IPCOM000013086D, Dec. 1, 1999, 4 pages.

Ahmad et al., U.S. Appl. No. 16/789,569, filed Feb. 13, 2020.

Katagiri et al., U.S. Appl. No. 13/676,477, filed Nov. 14, 2012.

\* cited by examiner

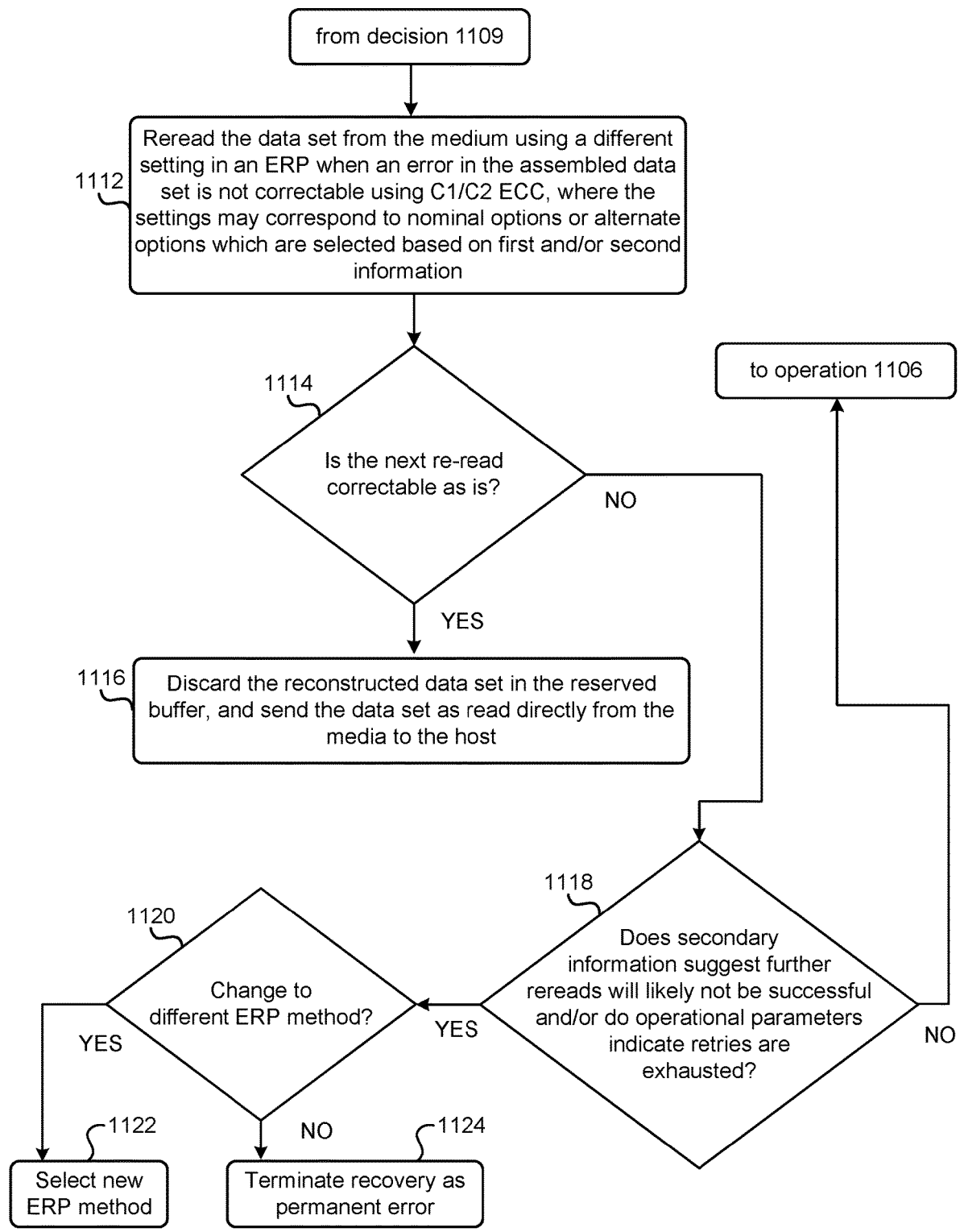
FIG. 11 (contd.)

ADJUSTING ERROR RECOVERY PROCEDURE (ERP) IN DATA DRIVE BASED ON HISTORICAL ERP INFORMATION

BACKGROUND

The present invention relates to data storage systems, and more particularly, this invention relates to error recovery procedures in data storage devices.

While performing data operations using a magnetic or optical data storage system, there are many reading and writing decisions that need to be made in real-time, as there are many factors that determine whether a write or read is successful. As a classic example, if there is a failed write or read operation, the question arises as to whether the error is due to the drive or due to the media.

Data storage drive error recovery procedure (ERP) is currently driven by error symptoms and patterns limited to the current mount, and thus has no perspective on how the drive and/or the particular media being operated on behaves in a larger population of drives and media. Current mount history does allow for dynamic decision making and optimization of recovery processes, but lacks the perspective of performance across a larger population. Using large population knowledge, the data storage drive can further optimize recovery by favoring recovery schemes that most closely match the current situation, and/or minimizing and/or bypassing recovery options that would likely only add time, stress, and/or wear to both the media and hardware.

Tape and optical storage devices use very powerful error correction codes, such as product codes or concatenated codes, in conjunction with interleaving to provide a very high degree of data integrity. These error correction schemes typically use two error correction codes (ECCs) as component codes. Two important burst-error performance measures for tape storage systems protected by these schemes are: 1) lateral width of an erroneous stripe which is still capable of being corrected (this is also known as "broken track correction" capability), and 2) longitudinal width of an erroneous stripe that is still capable of being corrected. A "broken" track generally refers to a track that cannot be read correctly due to a problem on the media itself and/or a problem with the readback channel, e.g., as a channel that does not detect data correctly because of alignment or some systematic problem with the head.

When a tape drive reads data from a tape, or when a tape drive writes data to a tape, a unit of data that is read or written is referred to as a "data set." The data set is encoded using interleaved sets of codewords that are organized into a group of sub data sets each comprised of an ECC-encoded matrix of size M bytes×N bytes (M×N) and then written to tape as shown in FIG. 12, according to the prior art. There are two levels of encoding within this matrix 1200. The first level of encoding utilizes the matrix rows 1202. Each row 1202 of the matrix contains C1-ECC row parity 1206, which adds p-bytes of C1-ECC to the n-bytes of user data (e.g., N=n+p bytes). The second level of encoding, C2-ECC column parity 1208, adds q-bytes of C2-ECC to each matrix column 1204. For example, if q=12, then adding 12 bytes of C2-ECC would add 12 rows to the matrix 1200 (e.g., M=m+q bytes).

When the data set is read from the tape in a high error rate condition, C1/C2 ECC is not capable of correcting the read data. For example, in some approaches, C1-encoding is capable of correcting 10 bytes of error, and C2-encoding is capable of correcting 20 bytes of error. If the error bytes exceed this correction power, then data cannot be read from the tape. In this scenario, the tape drive will then attempt ERP to read the data set from the tape again with a different hardware setting (e.g., changing the tape speed). ERP repeats until C1/C2-encoding is able to correct the data or until the ERP retry count exceeds a threshold. If the retry count exceeds the threshold, then the tape drive will report a permanent error for the read operation.

There are several problems with this conventional approach. First, if the error rate is consistently high, C1 and C2 cannot correct the data and the tape drive fails to read the data set, which is extremely undesirable. Second, in areas of tape where the error rate is high due to media damage, marginal writing, data written in older formats, etc., the drive may fail to read. Third, in these cases, often many data sets in proximity may require ERP. If a dataset error is recoverable with many retries (many iterations of ERP), the next data set may presumably require similar retries to successfully read the data. All this recovery causes the tape drive to take a long time to read data due to the multiple backhitches necessary to reread the data from the tape, which degrades host performance and can also further damage media.

Moreover, a large number of backhitches performed at a same location on a tape may aggravate the problem that caused the error, potentially leading to making the data harder to read over time.

Accordingly, it would be beneficial to have a data recovery procedure that increases the efficiency of reading stored data from data storage media.

SUMMARY

A method for selecting parameters of an error recovery procedure, in accordance with one embodiment, includes detecting an error during performance of a data operation on a data storage medium by an apparatus. In response to detecting the error, parameters of an error recovery procedure are selected based at least in part on: (a) first information about previous interactions between the apparatus and multiple data storage media, and (b) second information about previous interactions between the data storage medium and other apparatuses.

An apparatus, in accordance with one embodiment, includes a drive mechanism for passing a data storage medium over a transducer (or equivalently, transducers) configured to perform data operations on the data storage medium, and a controller electrically coupled to the transducer. The controller is configured to perform the foregoing method.

A computer program product for selecting parameters of an error recovery procedure, in accordance with one embodiment, includes one or more computer readable storage media, and program instructions collectively stored on the one or more computer readable storage media. The program instructions include program instructions to detect an error during performance of a data operation on a data storage medium, and program instructions to select parameters of an error recovery procedure based at least in part on: (a) information about previous interactions between an apparatus and multiple data storage media, and (b) information about previous interactions between the data storage medium and other apparatuses.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
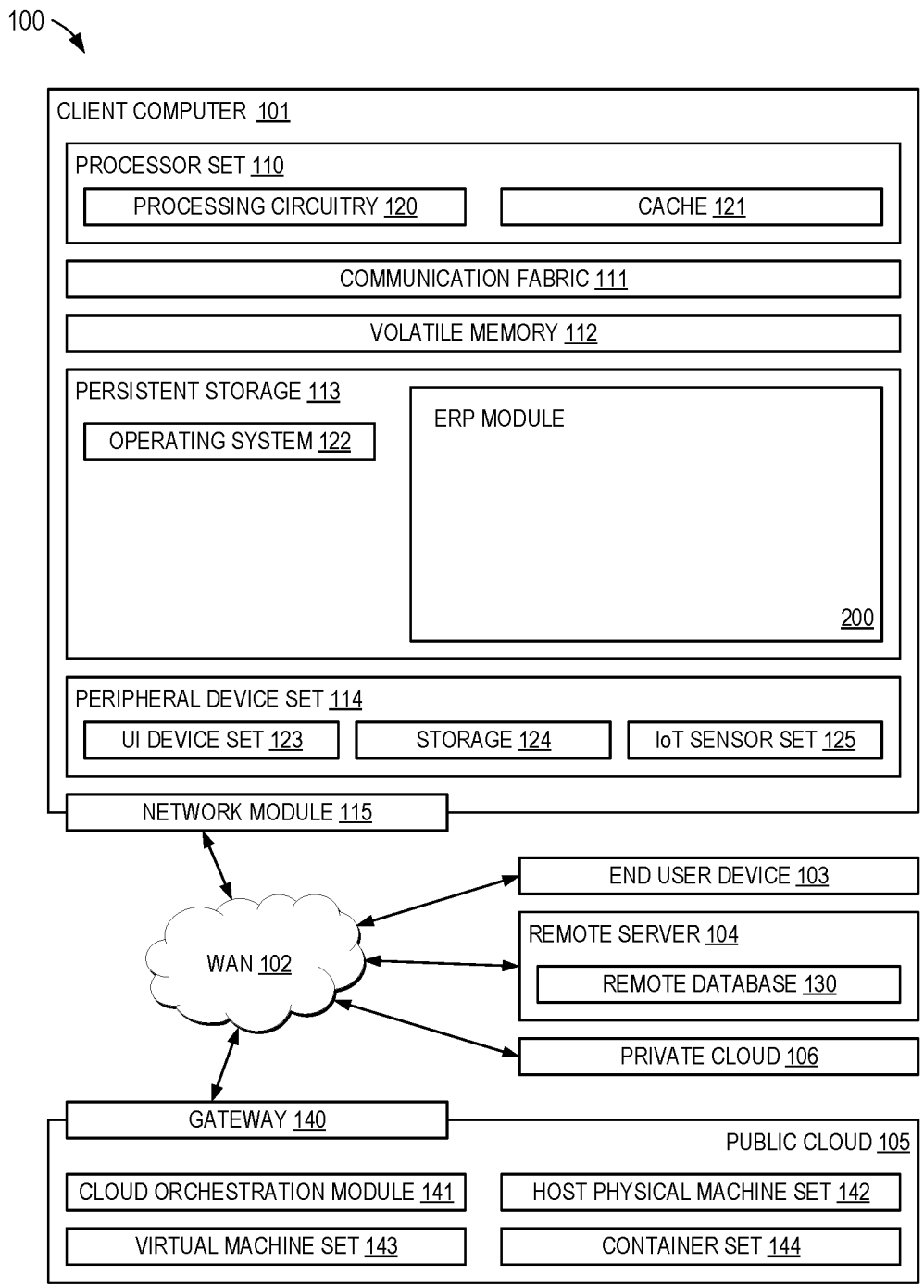
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof. While many of the illustrative embodiments below describe a magnetic tape drive, this has been done by way of example only. Various embodiments are equally applicable to optical and other types of data storage technology, as would become apparent to one skilled in the art after reading the present disclosure.

In one general embodiment, a method for selecting parameters of an error recovery procedure includes detecting an error during performance of a data operation on a data storage medium by an apparatus. In response to detecting the error, parameters of an error recovery procedure are selected based at least in part on: (a) first information about previous interactions between the apparatus and multiple data storage media, and (b) second information about previous interactions between the data storage medium and other apparatuses.

In another general embodiment, an apparatus includes a drive mechanism for passing a data storage medium over a transducer (or equivalently, transducers) configured to perform data operations on the data storage medium, and a controller electrically coupled to the transducer. The controller is configured to perform the foregoing method.

In yet another general embodiment, a computer program product for selecting parameters of an error recovery procedure includes one or more computer readable storage media, and program instructions collectively stored on the one or more computer readable storage media. The program instructions include program instructions to detect an error during performance of a data operation on a data storage medium, and program instructions to select parameters of an error recovery procedure based at least in part on: (a) information about previous interactions between an apparatus and multiple data storage media, and (b) information about previous interactions between the data storage medium and other apparatuses.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 200, which is an ERP module having ERP code for selecting an ERP procedure based on information about previous ERP procedures. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up the busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
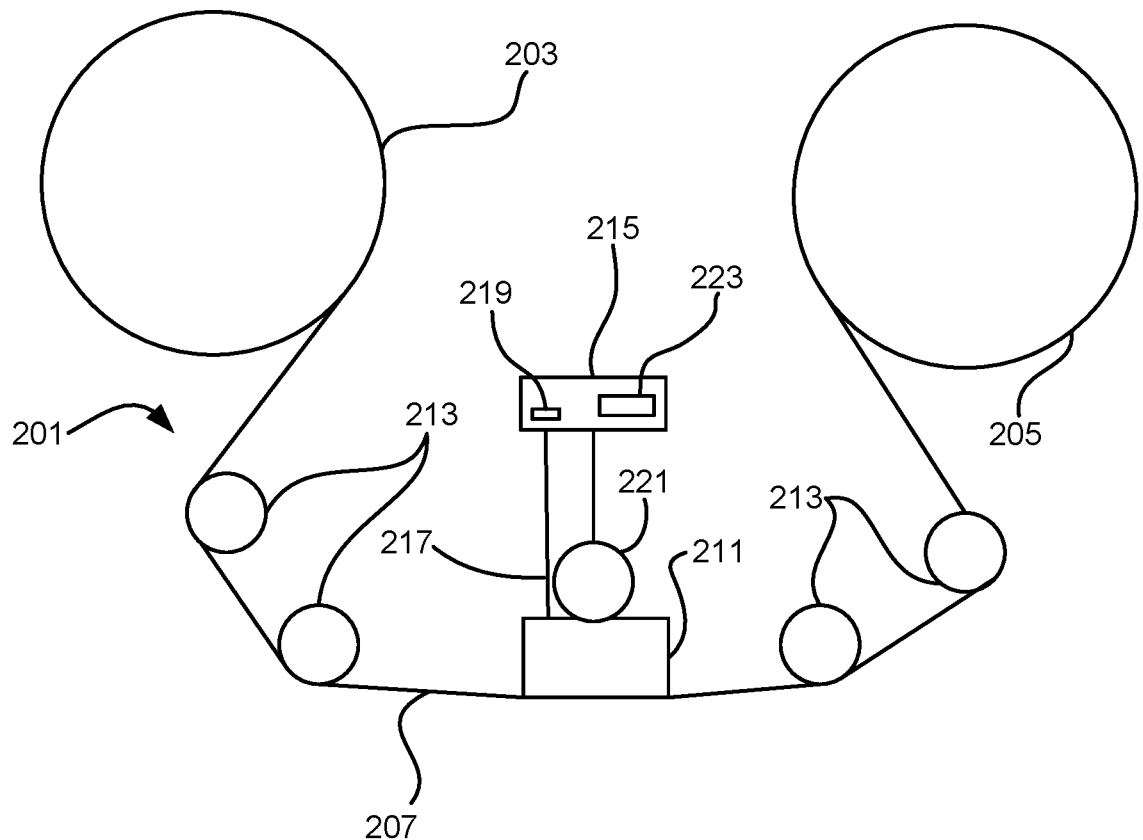
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
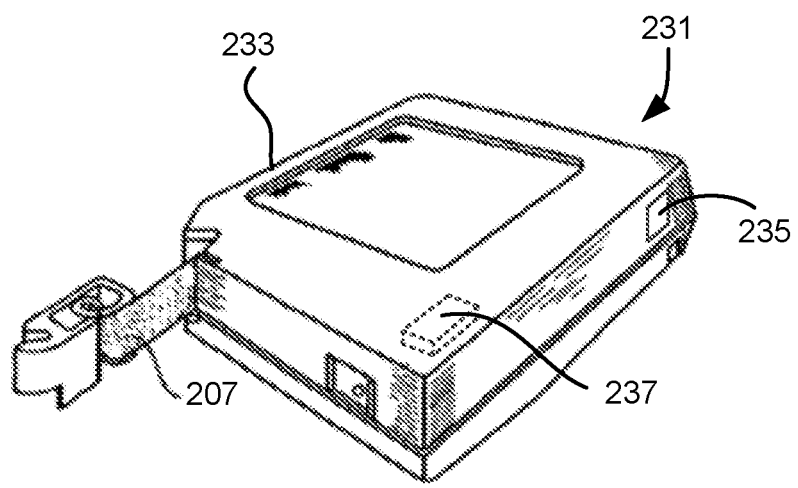
FIG. 2B is a schematic diagram of a tape cartridge, in accordance with one embodiment.

FIG. 2B illustrates an exemplary tape cartridge 231 according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
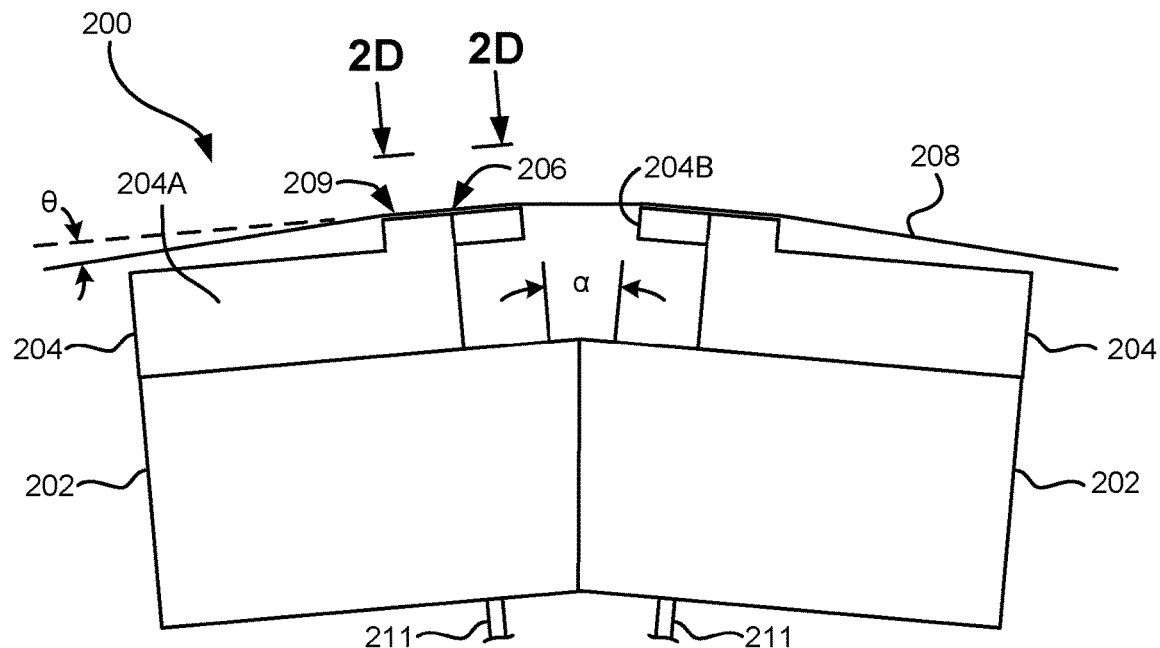
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
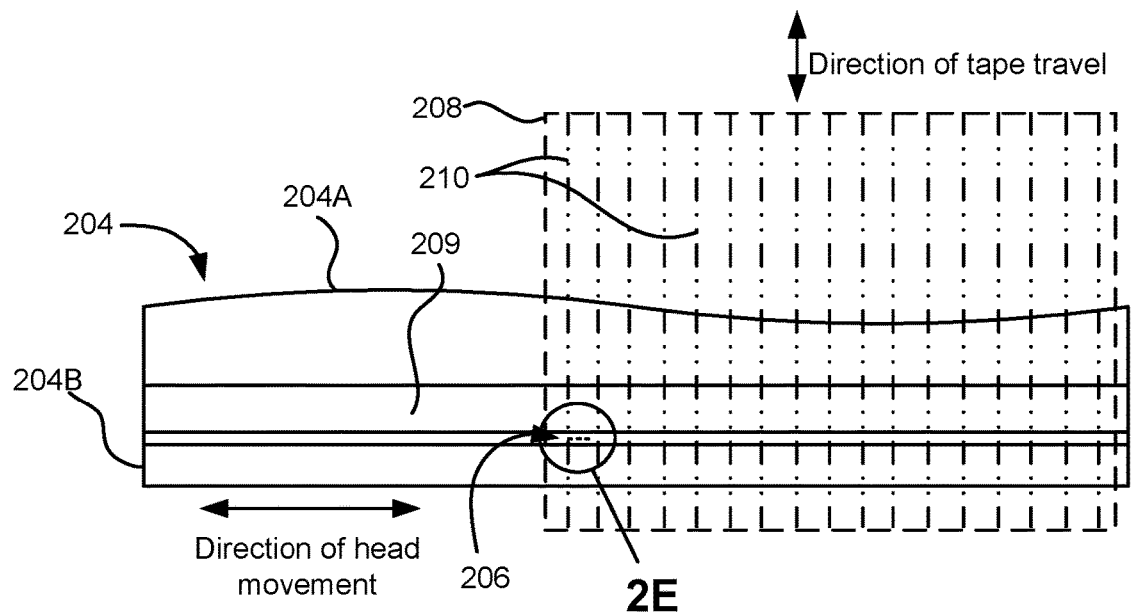
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
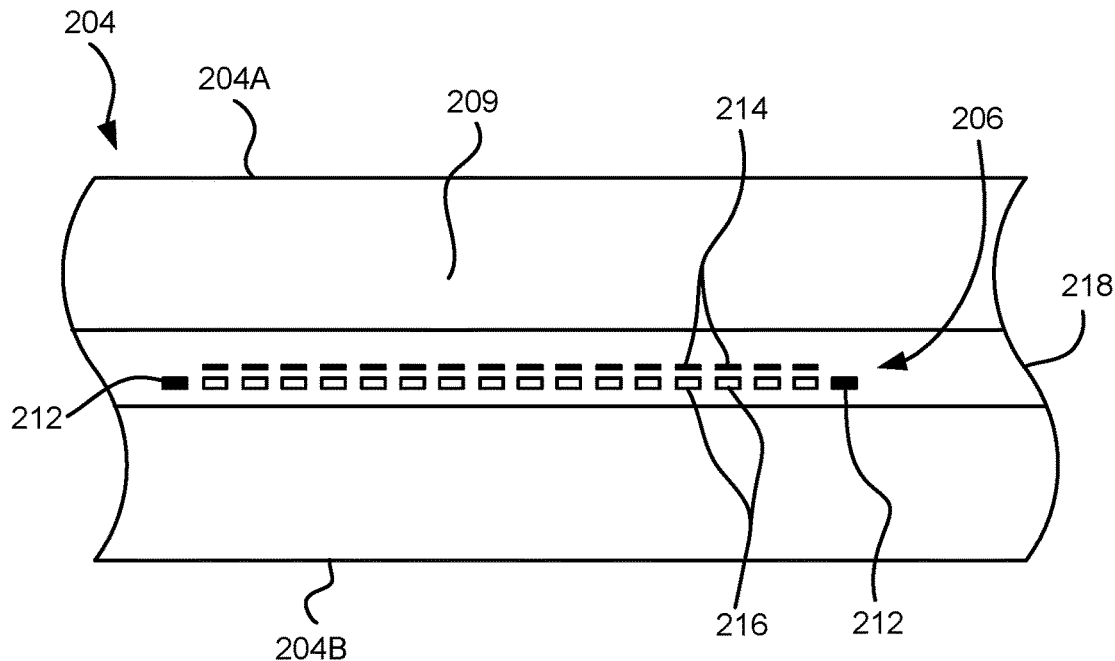
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
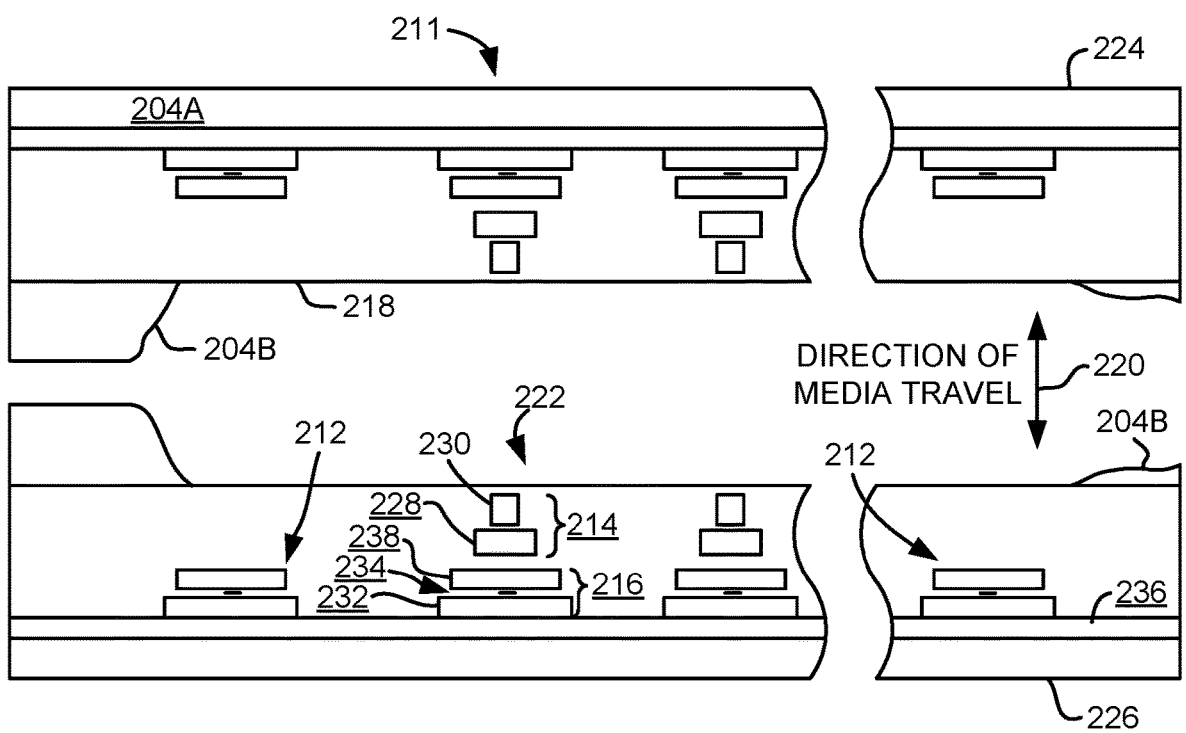
FIG. 2F is a detailed view of a partial tape bearing surface of a pair of modules.

FIG. 2F shows a partial tape bearing surface view of complementary modules of a magnetic tape head 211 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
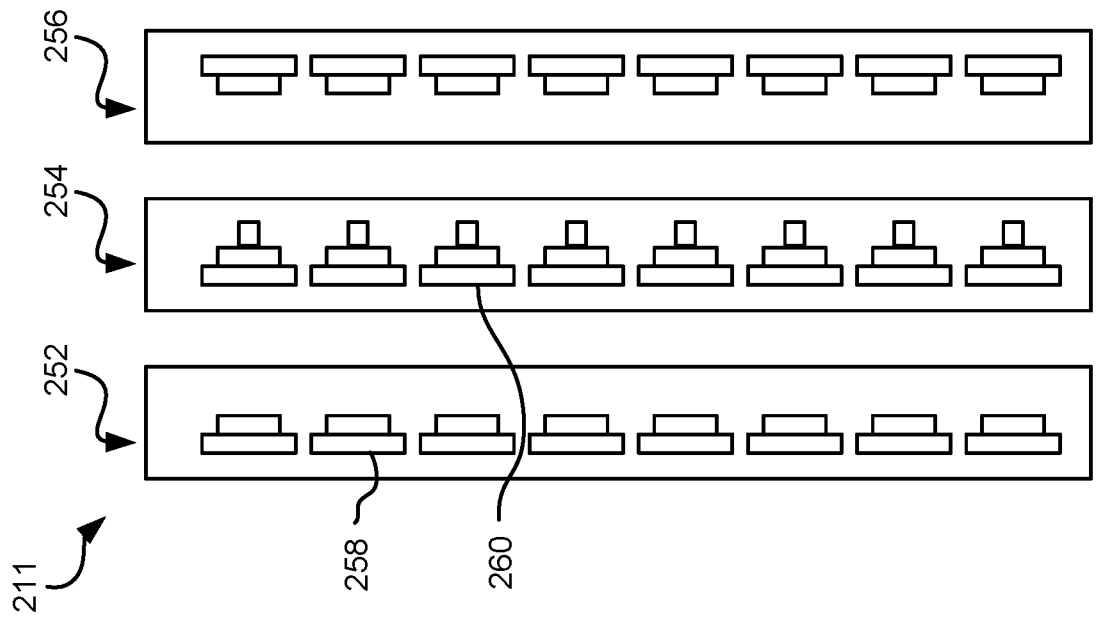
FIG. 4 is a partial tape bearing surface view of a magnetic head having a read-write-read configuration, in accordance with one embodiment.
Figure 3:
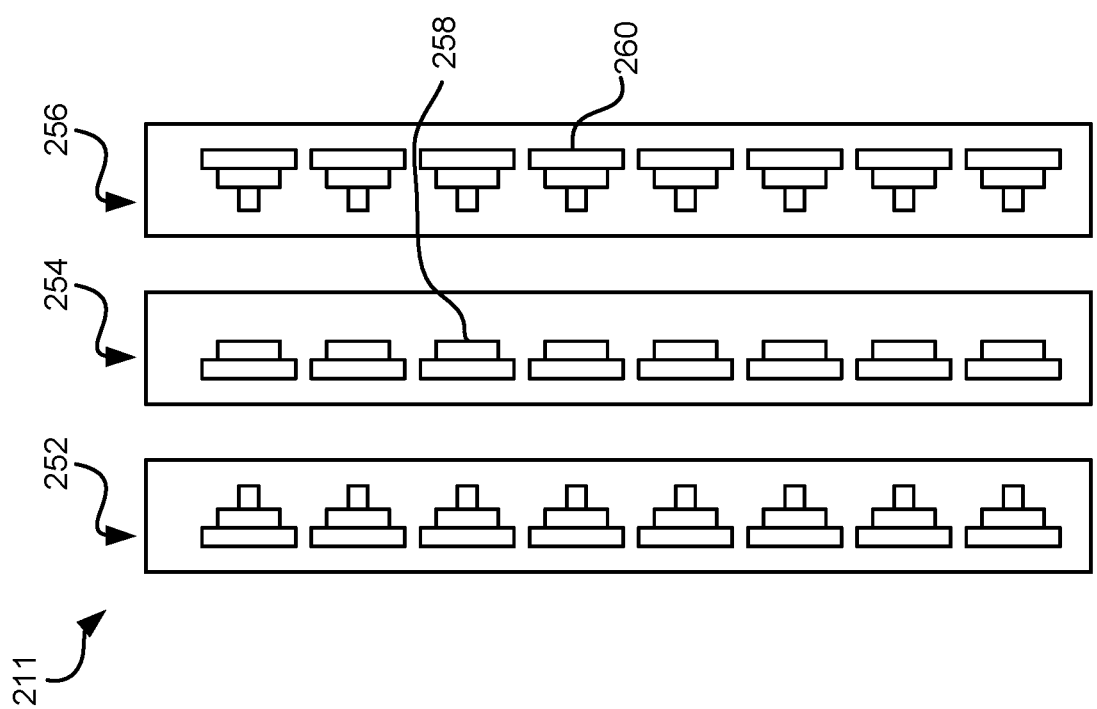
FIG. 3 is a partial tape bearing surface view of a magnetic head having a write-read-write configuration, in accordance with one embodiment.

The configuration of the tape head 211 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
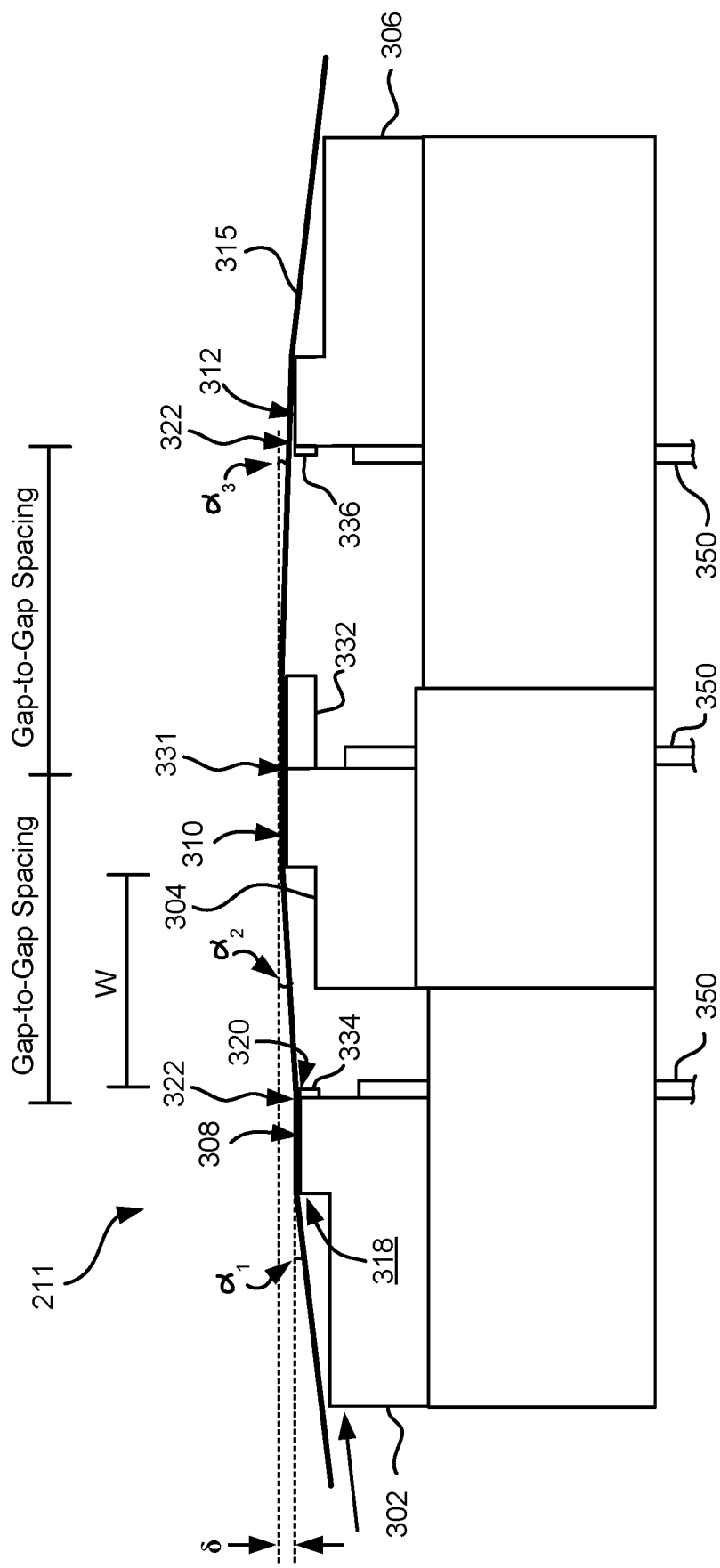
FIG. 5 is a side view of a magnetic tape head with three modules according to one embodiment where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
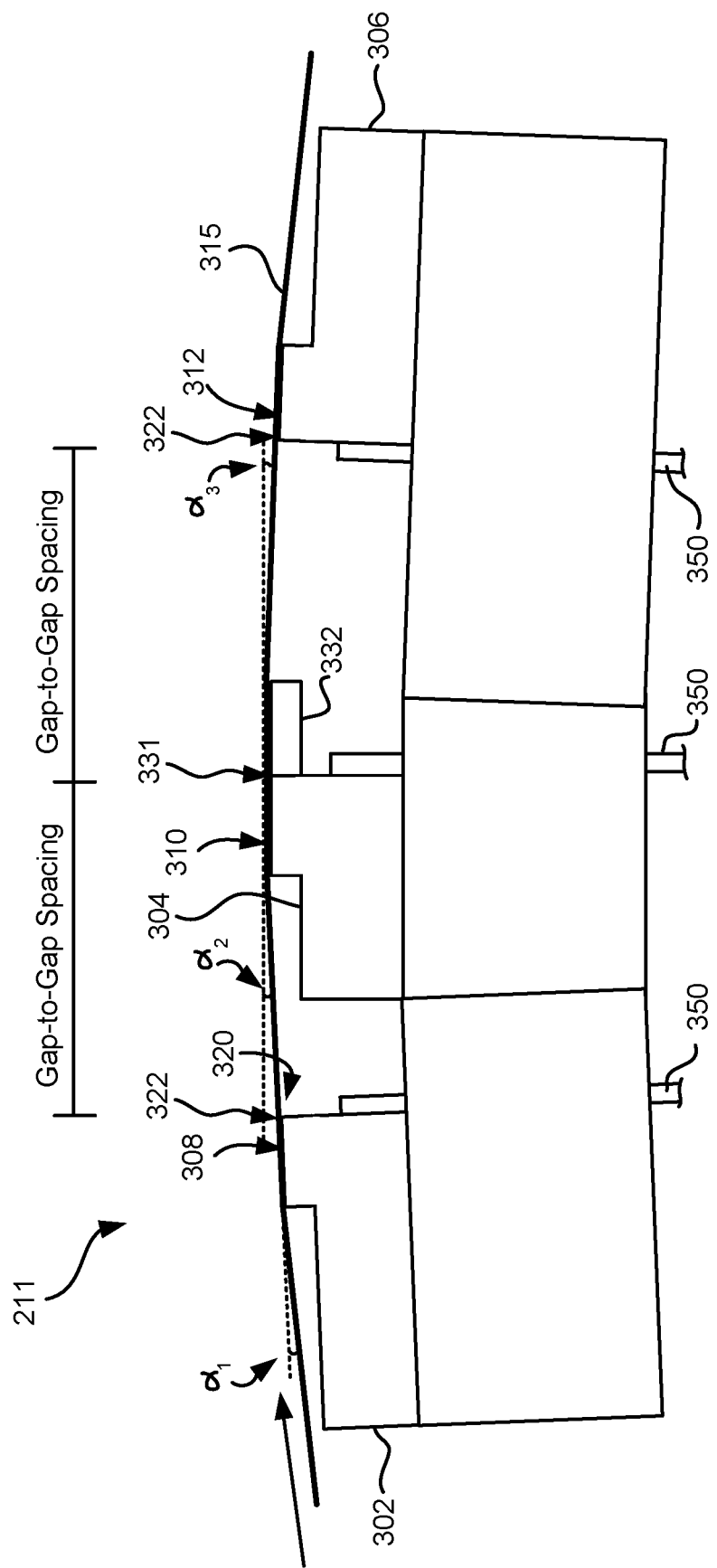
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha 2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha 2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha 2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
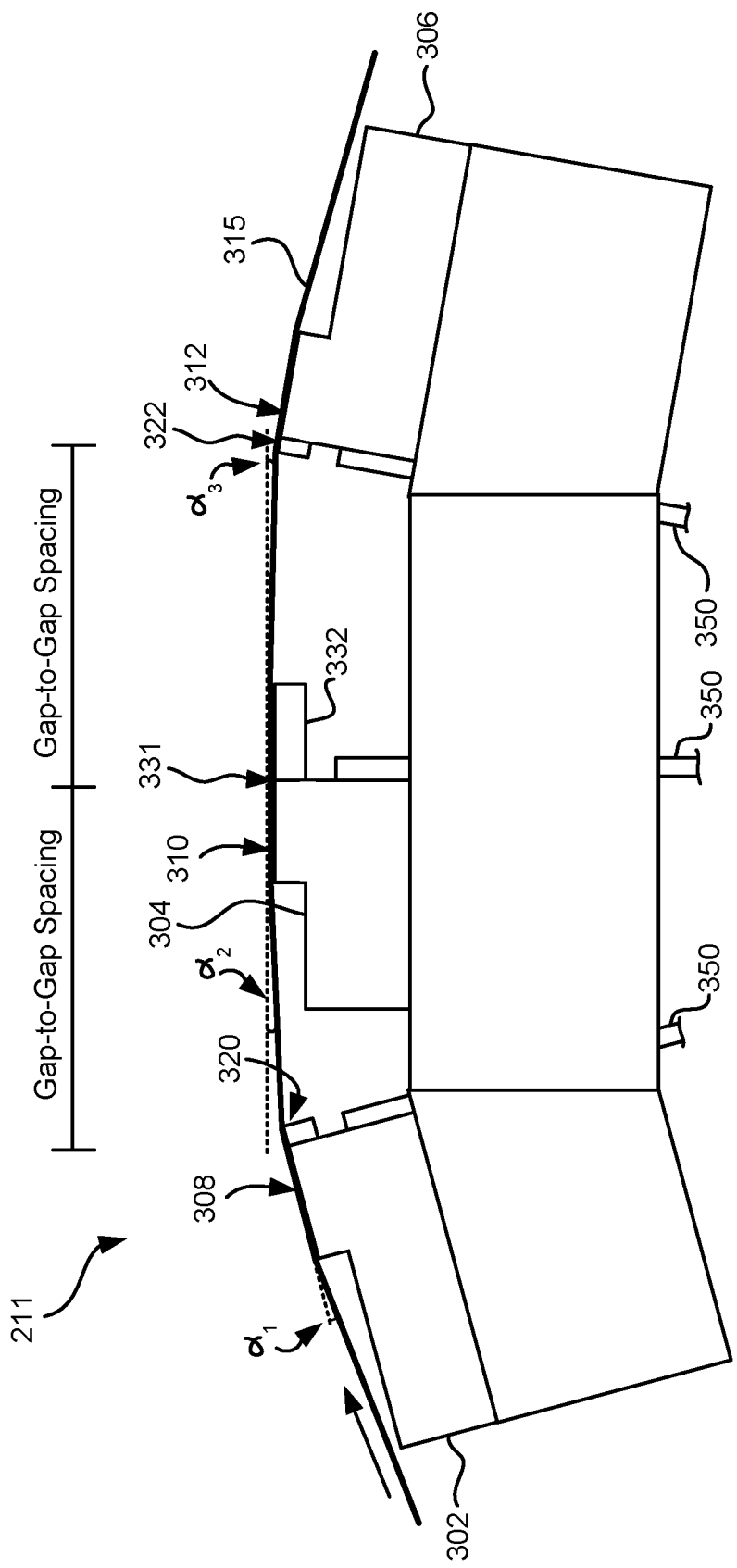
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
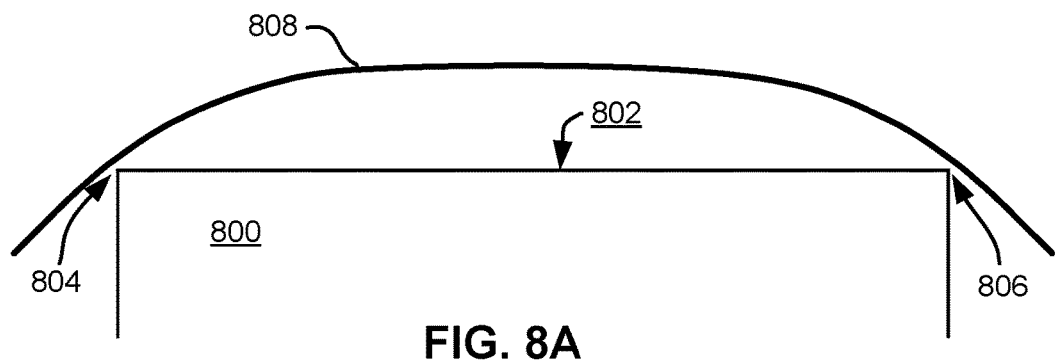
FIGS. 8A-8C are schematics depicting the principles of tape tenting.
Figure 8B:
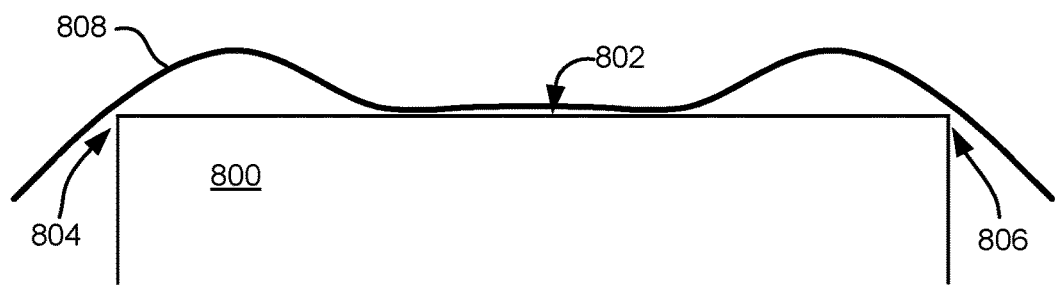
Figure 8C:
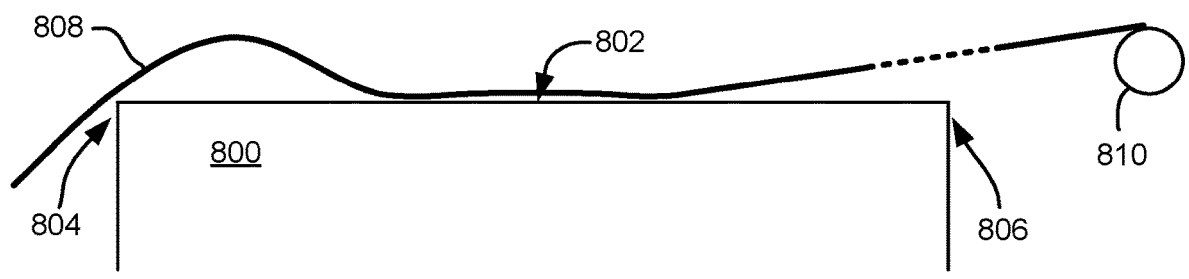

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
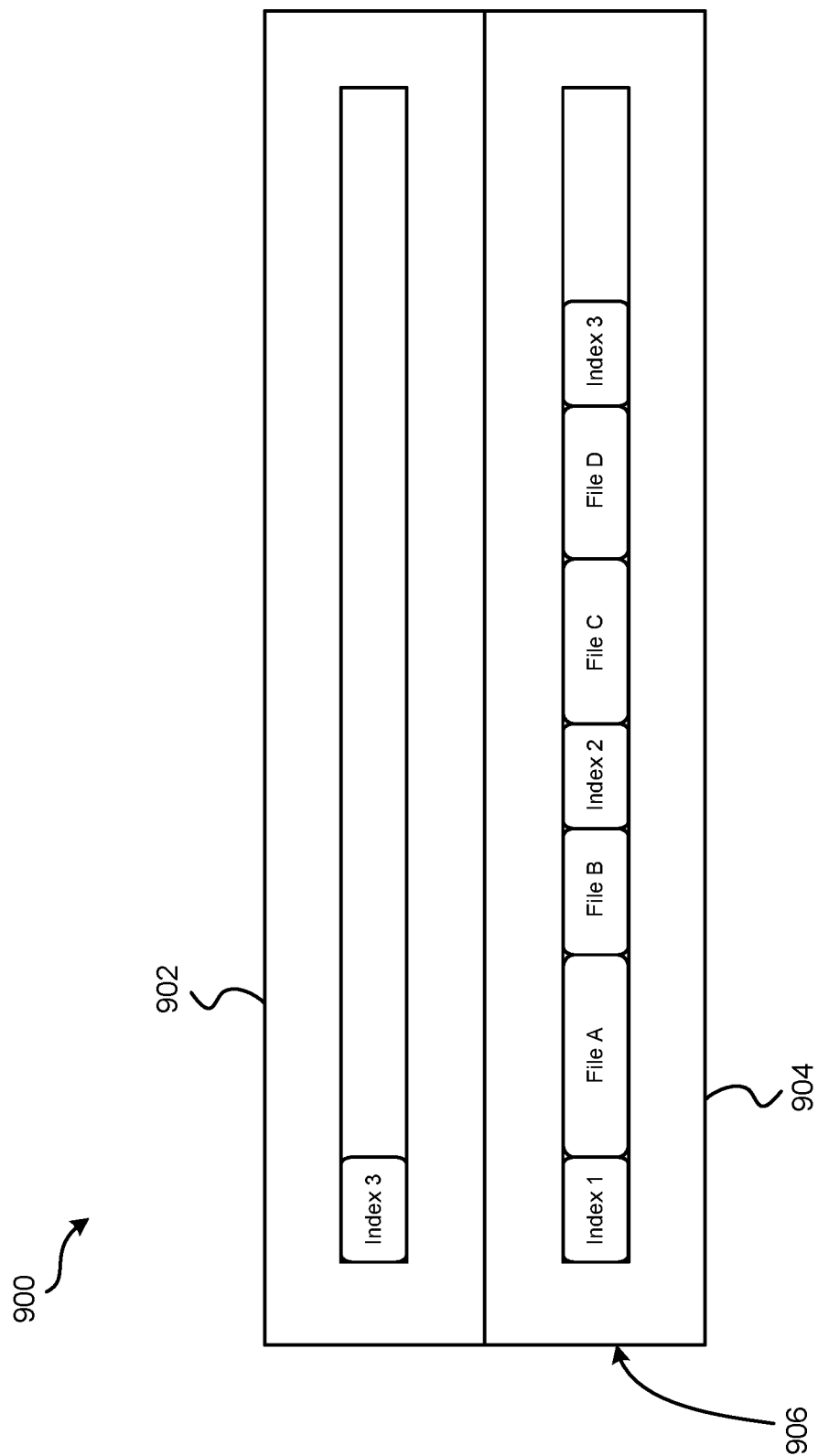
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Referring now to error correction, the set of information previously available to a data storage drive such as a tape drive, optical drive, etc. was solely based on the current mount, i.e., the current data storage medium that is currently loaded in the data storage drive. Accordingly, prior to the present invention, data storage drives had very little context with which to select ERP, and thus typically followed a preprogramed sequence of ERP stages.

Various embodiments described herein use first information about previous interactions between an apparatus (e.g., data storage drive) and multiple data storage media and/or second information about previous interactions between the data storage medium and other apparatuses (e.g., data storage drives) to intelligently select parameters of an ERP that is more likely to succeed in less time, and/or results in less wear and damage to the apparatus and/or data storage medium. Various approaches may use data and Artificial Intelligence (AI) technologies such as inferencing within the data storage drive to make decisions based on factors outside of the drive.

Figure 10:
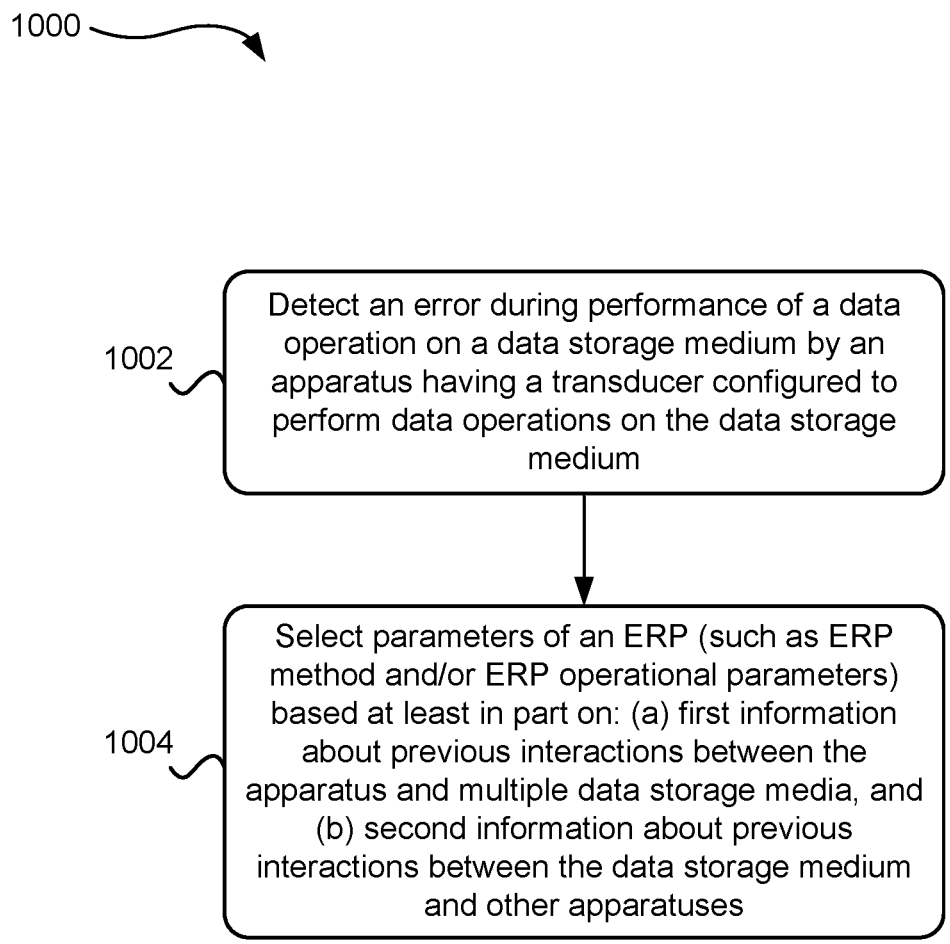
FIG. 10 is a flowchart of a method, in accordance with one embodiment.

Now referring to FIG. 10, a flowchart of a method 1000 for selecting parameters of an error recovery procedure is shown according to one embodiment. The method 1000 may be performed in accordance with the present invention in any of the environments depicted in FIGS. 1A-9, among others, in various embodiments. Of course, more or fewer operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a data storage drive or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, which includes detecting an error during performance of a data operation on a data storage medium by an apparatus (e.g., data storage drive compatible with the data storage medium) having a transducer (or equivalently, transducers) configured to perform data operations (e.g., read and/or write operations) on the data storage medium.

In operation 1004, in response to detecting the error, parameters of an ERP, such as one or more ERP methods and/or ERP operational parameters, are selected based at least in part on: (a) first information about previous interactions between the apparatus and multiple data storage media, and (b) second information about previous interactions between the data storage medium and other apparatuses (e.g., data storage drives). Note that the ERP may not have started yet, may already be in progress, may have attempted some procedures and failed, etc. Once at least some of the parameters are selected, an ERP may be performed using the selected parameters.

Preferably, the method 1000 is performed by the data storage drive. However, in other approaches, the method 1000 may be performed in part by the drive and in part by another computer, e.g., the ERP parameters may be selected by a controller of a library housing the drive.

Detection of any error may result in performance of operation 1004. Conventional processes for detecting errors may be used in various embodiments. For example, an error may be detected in response to a data stream failing a cyclical redundancy check (CRC), in response to detecting improper written data during read-while-write, a bit error rate (BER) approaching the ability of ECC to recover the data, the BER exceeding a predefined threshold, loss of signal in a data channel, high noise or detection of a concatenated signal in a channel indicative of reading two data tracks, etc. Moreover, the error need not necessarily be in a data channel; the methodology presented herein is equally applicable to handling an error in a servo channel.

In some approaches, the first information is stored on the apparatus (e.g., data storage drive), while the second information is stored on (e.g., on the medium itself) and/or with the data storage medium (e.g., in a cartridge memory). In other approaches, the first and/or second information may also and/or alternatively be available from another storage location, for example a memory of a library in which the drive and media reside.

The first information may include information about previous interactions between the apparatus and the data storage medium upon which the present error occurred, as well as information about previous interactions between the apparatus and other data storage media.

In some approaches, the first information includes information such as one or more of: a calibration of the transducer, e.g., drive heads (for data and/or servo channels), mount related data (e.g., writes/reads/errors/error location references, informational data, performance rates, environmental ranges, etc.), and preventative drive events (such as POST diagnostic failures, Mid Tape Recovery (MTR) following tension loss, and other corrective and/or self-diagnostic drive actions taken that affect drive or tape health).

Similarly, the second information may include but is not limited to information such as one or more of: information about an error during a data operation on the data storage medium, error location references, performance rates, environmental ranges during performance of data operations, environmental ranges during previous errors, etc.

In some approaches, the first information and/or the second information includes information such as one or more of: error pattern data that is related to servo, and information about error correction failures, etc. Information about error correction successes may also be found in the first and/or second information.

In some approaches, the first information and/or the second information includes information such as one or more of: positional metrics of error burst counts, statistics (e.g., average and/or longest percentage) of time-in-wrap due to error recovery procedures, information about recovery-perceived track degradation (this is an ERP perspective of channel dropout that can be associated to debris or damage), and a severity level for recovered errors which can reference most-successful error recovery parameters and drive settings corresponding thereto.

Various aspects of the present invention use first and/or second information collected by a data collection system such as a TER (Tiered Event Repository) configuration or other similar information storage scheme to store and provide access to the aforementioned first and second information. For simplicity, the description herein shall refer to "TER," it being understood that any similar data collection and/or distribution system may be used to collect and/or simply provide the first and/or second data.

Preferred approaches for implementation in magnetic tape recording systems use an LTO-compliant TER. One type of TER usable with various aspects of the present invention is the TER introduced with the release of LTO9. This version of TER has two components: Hardware TER (HTER) and Volume TER (VTER). Each component has its own storage location. HTER is saved in nonvolatile space on the tape drive, and VTER is saved on the tape cartridge. The current version of LTO-compliant TER builds an extensive 100 Kib queue in HTER with statistical data pertaining to the tape drive (TS1150+ and LTO7+) as well as a 2 Kib queue in VTER with statistical data pertaining to tape media (currently LTO9 only).

TER enables building of a collection of detailed data about the drive and the tape health over many mounts. This can be done by collecting an event history that the drive experiences during its life cycle. Such events, corresponding to first data, may include but are not limited to one or more of: the calibration of a transducer (e.g., drive heads for the data and/or servo channels), mount related data (e.g., writes/reads/errors/error location references, informational data, performance rates, environmental ranges, etc.), and preventative drive events (such as POST diagnostic failures, MTR following tension loss, and other corrective and/or self-diagnostic drive actions taken that affect drive or media health).

In some aspects, the TER may be configured to use flexible data structures in order to collect only pertinent and relative data during such events. In this way, more relevant data that has been pre-processed is saved, which in turn saves analysis time. Preferably, the data structures used are agile and are thus able to easily accommodate future changes as drive and tape design evolves, whether such changes involve new metrics or the removal of obsolete ones.

With such an extensive performance history stored on the tape drive, on the tape media, or externally, the microcode within the drive has access to a plethora of data that can be used to enhance, minimize or otherwise redirect nominal error recovery strategies.

For example, using a TER, the tape drive now has the ability to look at information, statistics, and/or metrics from the tape drive's previous mount history (e.g., about 500-800 last mounts, but could be more or less) and/or the media's previous mount history in other tape drives (e.g., about 10-15 last mounts, but could be more or less).

Today TER is supported on TS11XX and LTO7 and higher tape drives; thus, historical data about the drive/cartridge that are already being collected may be used.

As should now be apparent, TER provides a wealth of information, which is leveraged by various aspects of the methodology described herein to enable selection of ERP stages intelligently. For example, a tape drive may detect that it is in a recovery burst across multiple datasets which are in close proximity; or the tape drive may detect that it is spending an unusual amount of time in ERP on a particular wrap or in a particular direction. This could be due to debris, defect or degradation in the tape path or media. There are default mount ERP strategies for these cases, but with access to the aforementioned first and/or second information, and using the teachings herein, the tape drive has more context to the problem and can select the best ERP processes for the situation. For example, such context may include that the tape has high error rates on other drives, or this drive may have a history of poor performance on this particular tape cartridge that other drives do not. Because meaningful correlations can now be made that point to the drive or medium as the likely culprit, then the recovery strategy can be created and/or adjusted to limit the risk of further damage due to repeated, excessive recovery. Illustrative adjustments to a predefined recovery strategy may include limiting the range of recovery options performed, targeting particular recovery options for performance, and/or indicating a permanent error after only a few retries for preventative action to be taken.

In some aspects, use of TER offers a high level scope into error recovery history because it covers a large population of drives and media. Moreover, because drive level error recovery is reactionary by nature, a drive can maintain a more granular history of events, trends and location information during interaction with a given medium. This information can be added to TER at the end of the current mount. Being able to combine the two perspectives (high level and granular) enables strong opportunities for pattern matching, trend correlations and failure mode projections. Such a cross-correlation can be used, in turn, to assign fault to the drive or media as the primary culprit for the error. The feedback response by drive ERP can be programmed to such that the ERP can either act on the knowledge or do so conditionally based on some user-specified operating mode.

Based on the first and/or second data, the parameters of the ERP are selected. Such parameters may include which ERP methods to perform, as well as operational parameters of the selected methods. For example, illustrative parameters may include one or more of: certain ERP methods to perform; which ERP stages to perform; in which order to perform the stages of the ERP; when to determine that the error is a permanent error in response to performing a lesser number of stages without rectifying the error etc. An ERP stage may generally refer to a particular predefined sequence of events directed at resolving an error by using a set of options having a common focus, such as in a stage that attempts to read data using variable tape tension, a stage that attempts to read data using variable servo parameters, a stage that attempts to read data using variable dataflow ECC correction, clocking and channel parameters, a stage that attempts to read data using a different medium speed across the transducer(s), a stage that verifies proper positioning of the transducer(s) relative to data, a stage that attempts to clear debris, etc. Any type of logical decision making process known in the art may be adapted for selecting the parameters based on the first and/or second information. For example, an AI engine of a type known in the art may be adapted and configured according to the teachings herein to select the parameters.

When selecting the parameters of the ERP, according to various approaches, nominal (e.g., default) or predefined ERP strategies can be targeted, re-ordered, combined, and/or limited according to what is deemed as the most-effective subset of nominal recovery. For example, this can include restrictions on the use of any long time-duration methods, e.g., selecting a lesser number of stages of the ERP than a default number of stages. The goal in these situations is to recover more efficiently or terminate recovery and indicate a permanent error without undue stress and wear when a drive/cartridge combination will likely experience long, repeated recovery sessions with excessive backhitching. This feedback can also lower the risk of command timeout due to extended or lengthy recovery actions. An appropriate hardware and/or media tape alert may accompany any permanent error under these circumstances and TER may add a notification counter. When a cartridge or drive is selected for failure analysis, full recovery methods can be enabled in a controlled environment.

In some approaches, a determination is made as to whether the primary cause of the error is the drive or the medium. This determination can be made based on the first and/or second information. For example, detection of repeated errors at a given position on the medium across a variety of drives tends to indicate that the error lies with the medium. Accordingly, parameters of the ERP may be selected from a predefined group of parameters designated for overcoming an error caused by data storage media in general and/or for this specific medium. Parameters corresponding to recovery from errors due to a faulty apparatus can thus be minimized and/or avoided entirely, thereby preventing wear on the apparatus and/or media as well as saving time. Conversely, detection of an error that is similar to other errors encountered by the drive across multiple media may tend to indicate that the drive has some issue, and therefore parameters of the ERP may be selected from a predefined group of parameters designated to overcome an error caused by the drive. Parameters corresponding to recovery from errors due to faulty media can thus be minimized and/or avoided entirely, thereby preventing wear on the drive and/or media as well as saving time.

Over time, more mount-related error pattern data that is related to servo and error correction failures may be added to the first and/or second data for additional feedback. For example, some broad categories of current mount recovery could include positional metrics such as: error burst counts, average and longest percentage of time-in-wrap due to ERP, recovery-perceived track degradation (this is an ERP perspective of channel dropout that can be associated to debris or damage), and an ERP severity level for recovered errors. This ERP severity level may be based on metrics such as how many recovery stages were needed, which recovery stages were most successful, if recovery was tape dimensional stability (TDS)-related, if servo band related, if errors are clustered in close proximity or cyclical across multiple wraps, if there was a need for servo PES offsets together with reconstructive ERP, if extended servo interrupted write dataset handling occurred, and if there was use of long-duration methods such as repositioning, cartridge reload to clean head (rechuck), or servo-level ERPs.

As noted above, an ERP may be performed using the selected parameters.

In one approach, when an error is detected, an ERP may be performed on the media in an effort to recover the data set. During each read of the data set, settings are changed in an attempt to better read the data set from the medium. By better read, what is meant is that fewer errors are encountered in the read data set by adjusting the settings of the drive (according to the selected ERP parameters) used to read the data set from the medium.

In one embodiment, during each reread of the sub data set, operational settings are changed in an attempt to better read the data set from the medium. In a further embodiment, changing settings may include changing one or more of: medium speed during reading, tape tension, data flow ECC correction and clocking parameters, channel parameters, and servo tracking parameters, among other possibilities known in the art.

According to one embodiment, an ERP uses a reserved data buffer portion of a tape drive's data buffer to store data from repeated read recovery attempts on a data set. Within that reserved buffer space, the encoded data is iteratively reconstructed under microcode control on a sub dataset basis with each re-read from tape done by the error recovery procedure (ERP). Using reconstruction, portions of one or more sub datasets can be corrected with re-reads from tape that used different recovery settings. This eliminates the dependance on a good re-read from tape following a given setting change, since ECC improvements from multiple re-reads can be applied to the reconstructed data set until it successfully decodes. In that case, the reconstructed data set is sent to the host.

After each re-read of data from the tape, a determination is made on each sub data set as to which rows, each row including C1-encoded data, are satisfactory (referred to as good C1 rows) and which are not. This determination may be based on whether the C1 row has no errors or if the errors are correctable using C1-ECC. In the first read, all rows from each sub data set are stored to the reserved data buffer regardless of the quality of the read. However, in each subsequent read of the data from the tape, those C1 rows in each sub data set which are better than their previously stored values in the reserved data buffer will replace the C1 row currently stored thereto. Furthermore, any time a C1 row is stored to the reserved data buffer and is not C1 correctable (e.g., a C1 row which was stored in the first read), it is replaced by a subsequently read C1 row regardless of whether the subsequently read C1 row has less correctable errors or the same number of correctable errors therein since location of the error may be significant. Once each sub dataset has had updates applied by microcode to one or more C1-rows based on the latest re-read from tape, a C2-correction check is performed to see if the reconstructed data set is now readable. If C2-correction over the reconstructed data set is successful, then ERP recovery is complete. In one embodiment, the C1 rows may be stored to the reserved data buffer after an ERP retry step has completed (e.g., one reread of data from the tape).

Figure 11:
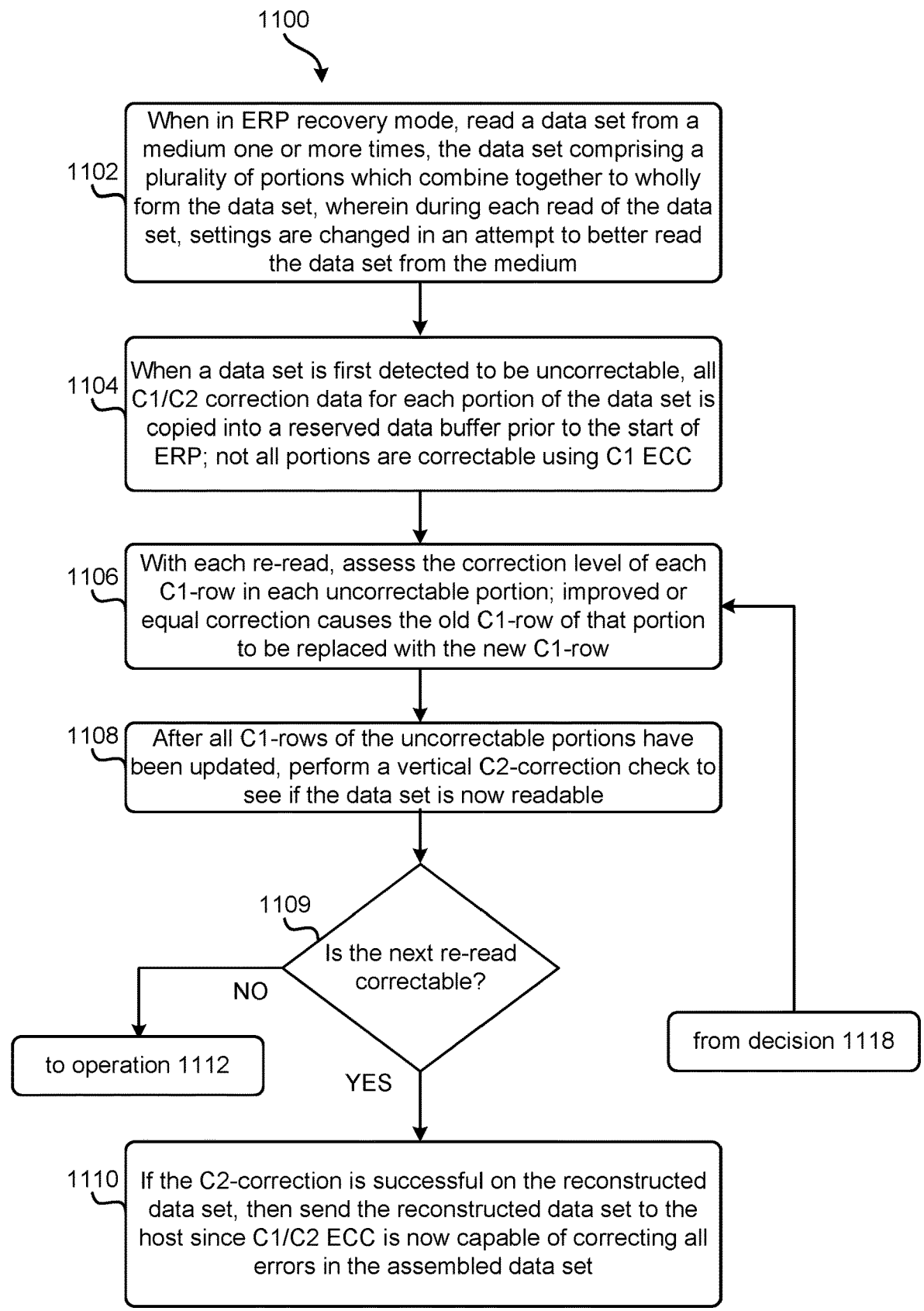
FIG. 11 is a flowchart of a method for reading data from a medium using a reconstructive ERP, in accordance with one embodiment.

Now referring to FIG. 11, a method 1100 for reading data from a medium using ERP is shown according to one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various non-limiting embodiments, the method 1100 may be partially or entirely performed by a C1/C2 decoding system, a tape drive, a hard disk drive, an optical drive, a controller, a processor (such as a CPU, an ASIC, a FPGA, etc.) which may be embedded in and/or operate within a system, etc.

As shown in FIG. 11, method 1100 may initiate with operation 1102, where a data set is read from a medium one or more times when in ERP recovery mode. The data set comprises a plurality of portions which combine together to wholly form the data set. In this way, each portion of the data set is combined together to form the whole data set; if any portion has not been saved to the reserved data buffer, then the whole data set cannot be formed. Each portion may be any part of the data set, and the data set may be represented by any structure. Furthermore, during each read of the data set, settings are changed in an attempt to better read the data set from the medium. By better read, what is meant is that fewer errors are encountered in one or more portions of the read data set by adjusting the settings used to read the data set from the medium.

Different settings may comprise a change to any suitable setting, such as any of the following: a medium speed during reading, a data flow correction power, channel parameters, servo tracking, etc.

Figure 12:
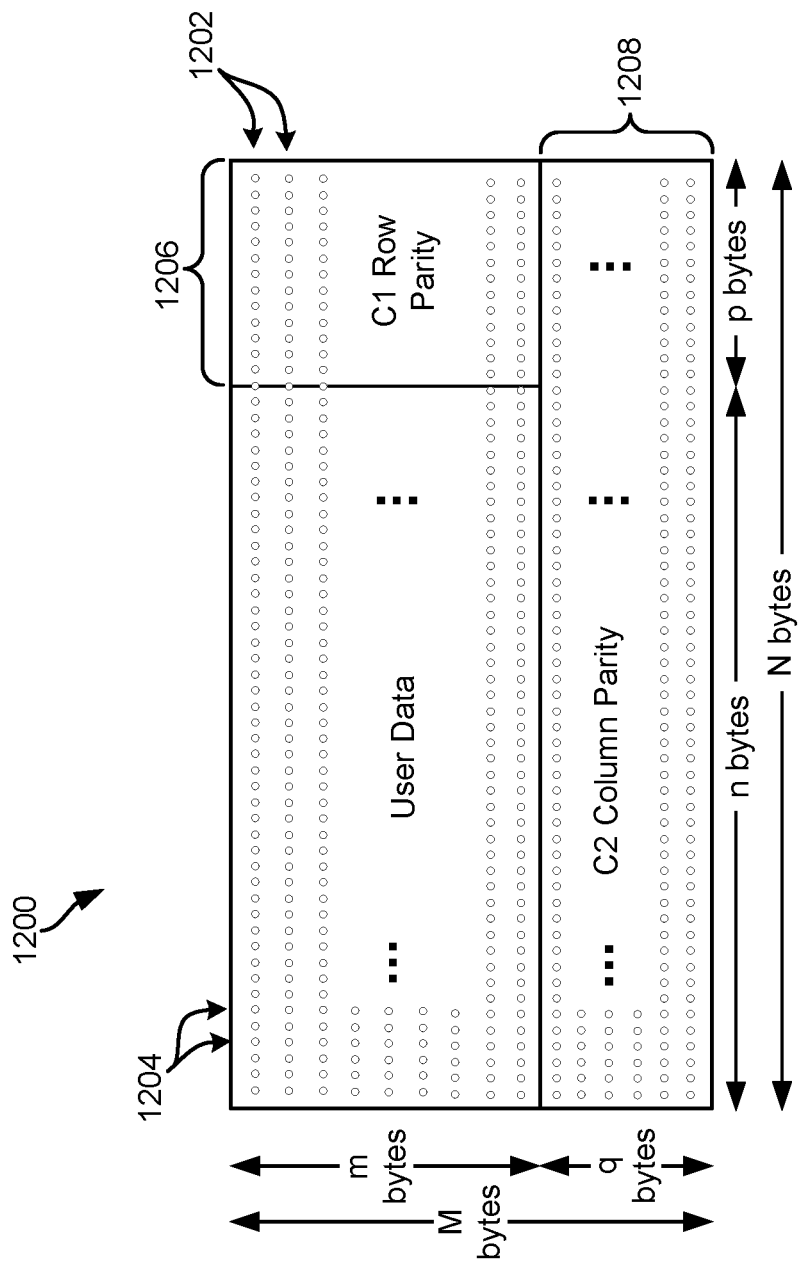
FIG. 12 shows a data set matrix or array, according to the prior art.

In one embodiment, each portion is a set of ECC structured sub datasets, each with an array of C1-encoded rows that are cross-corrected with a vertical or column C2-correction as shown in FIG. 12. Specifically, the plurality of portions may be sub datasets having a set of C1-encoded rows containing a fixed number of codewords plus parity bytes combined with a fixed number of C2 column parity bytes, which taken together represent the overall ECC encoded data set. Furthermore, each row of the sub data set arrays may comprise a header for additional correction of user data encoded and interleaved into C1 codewords therein. In another embodiment, each portion may use C2 column parity to correct any uncorrectable C1-rows.

In an optional operation, all portions of the data set may be stored to a reserved data buffer after a first reading of the data set from the medium. In this way, the data set may be stored to the reserved data buffer in its entirety, and portions may be overwritten when they are better than a portion already stored to the reserved data buffer.

The reserved data buffer may be part of a larger data buffer of a medium drive, such as a tape drive when the medium is a tape, or it may be a separate, dedicated memory for storage thereto, either in the drive or accessible to the drive used to read the data set.

In operation 1104, after the first unsuccessful reading of the data set, all C1/C2 data from all the portions of the data set are stored to the reserved data buffer where they will undergo possible reconstruction on subsequent rereads of the data set. When all portions of the data set are stored to the reserved data buffer, only the C1-rows of the uncorrectable portions stored there will be updated with better copies on subsequent reread attempts.

Referring to operation 1106, when an uncorrectable portion already exists in the reserved data buffer that matches a portion just read from tape in the current re-read, then the C1-rows of each are compared. Any improved C1-rows showing less correction will overwrite the existing C1-rows of that partition stored in the reserved buffer. For example, if a stored C1-row of a given portion has three corrected errors, and that same C1-row of that newly reread portion only has two corrected errors, the newly read C1-row will overwrite its counterpart C1-row within that same portion in the stored portion in the reserved data buffer.

With continued reference to operation 1106, the one or more reconstructed portions of the data set are aggregated in the reserved data buffer to form an assembled data set, wherein each of the portions have one or more updated C1-rows for improved C1 ECC.

In operation 1108, in order to determine if the reconstructed data set is now correctable a C2-correction pass over the C1-rows is performed to see if C2-ECC is capable of correcting any remaining errors in the assembled data set, if any such errors remain. In this way, if some errors remain in the data set after optimizing the C1-rows of uncorrectable portions, they may be corrected using C2-encoding across the portions. For example, if C1-row correction improvements are insufficient to cause a portion to be decodable, then the C2-encoding power across the columns may be used to correct any remaining errors.

At decision 1109, if the C2-correction is successful on the reconstructed data set, the process proceeds to operation 1110.

In operation 1110, any remaining errors in the assembled data set are corrected using C2-ECC to form a reconstructed data set and the reconstructed data set is sent to a host when C2-ECC is capable of correcting all errors in the assembled data set.

If, at decision 1109, the C2-correction is unsuccessful on the reconstructed data set, the process proceeds to operation 1112.

In operation 1112, the data set is reread from the medium using a different setting in an ERP reread when an error in the data set is not correctable using C2-ECC (or C1-ECC). The selected settings may correspond to nominal options or to alternate options which are selected based on first and/or second information from the TER. In this way, using different settings, such as different hardware settings, portions which were not recoverable in a previous read may now be recoverable, and the entire data set may be assembled in the reserved data buffer. If the data reread from tape is fully correctable, then that data is sent to the host and the reconstructed copy in the reserved data buffer is discarded. See decision 1114 and operation 1116. If the data reread from tape is not fully correctable, a determination may be made as to whether secondary information suggests further rereads will likely not be successful and/or whether operational parameters indicate retries are exhausted. See decision 1118. If the answer to either query (or both queries) is no, then the process returns to operation 1106 to continue attempting to recover the data until ERP retries are exhausted. If the answer to either or both queries is yes, a decision is made as to whether to change to a different ERP method. See decision 1120. Decision 1120 may be made based at least in part on or the first and/or second information from the TER, e.g., considering such things as whether a new ERP method would be successful based on the ERP method was previously successful in a similar situation, etc. In operation 1122, a new ERP method is selected, e.g., based on nominal options or alternate options which are selected based on the first and/or second information from the TER. If decision 1120 is not to change the ERP method, then recovery may be terminated, and the error indicated as a permanent error in operation 1124.

According to one embodiment, the method 1100 may be repeated until either a reconstructed data set is sent to the host, a data set successfully read as is from tape is sent to the host, or a number of allowable retries or the allowable time limit is reached, and the data set is reported to the host as unreadable. The number of allowable retries may be a hardware setting of a drive, a predetermined number based on past attempts, a user setting, or a number derived through any other method known in the art. Allowable time limits follow the same constraints and also take into account the command timeout values.

In other words, the data set is reread from the medium, existing portions in the reserved data buffer are overwritten with portions having fewer errors corrected therein, and it is determined whether C2-ECC is capable of correcting all errors in the assembled data set until either a reconstructed data set is sent to the host, a data set read correctly from tape, or a number of allowable retries is reached and the data set is reported to the host as unreadable.

First and second error information can be used to determine what settings might be optimal for data reconstruction in this area of tape. If first and second error information suggest a drive fault, then data set reconstruction might be limited or skipped entirely.

In one approach, the medium may be a magnetic tape, and the method 1100 may be performed by a tape drive.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selecting parameters of an error recovery procedure, the method comprising:
   detecting an error during performance of a data operation on a data storage medium by an apparatus; and
   in response to detecting the error, selecting parameters of an error recovery procedure based at least in part on: (a) first information about previous interactions between the apparatus and multiple data storage media, and (b) second information about previous interactions between the data storage medium and other apparatuses.

2. The method as recited in claim 1, wherein the first information is stored on the apparatus, wherein the second information is stored on and/or with the data storage medium.

3. The method as recited in claim 1, wherein the first information includes information about previous interactions between the apparatus and the data storage medium.

4. The method as recited in claim 1, wherein the first information includes information selected from the group consisting of: a calibration of a transducer, mount related data, and preventative drive events.

5. The method as recited in claim 1, wherein the second information includes information selected from the group consisting of: information about an error during a data operation on the data storage medium, error location references, performance rates, environmental ranges during performance of data operations, and environmental ranges during previous errors.

6. The method as recited in claim 1, wherein the first information and/or the second information includes information selected from the group consisting of: error pattern data that is related to servo, and information about error correction failures.

7. The method as recited in claim 1, wherein the first information and/or the second information includes information selected from the group consisting of: positional metrics of error burst counts, statistics of time-in-wrap due to error recovery procedures, information about recovery-perceived track degradation, and a severity level for recovered errors and corresponding most-successful error recovery parameters and/or drive settings.

8. The method as recited in claim 1, wherein the selection of the parameters of the error recovery procedure includes selecting an order of stages of the error recovery procedure.

9. The method as recited in claim 1, wherein selecting the parameters of the error recovery procedure includes selecting a lesser number of stages of the error recovery procedure than a default number of stages.

10. The method as recited in claim 9, comprising determining that the error is a permanent error in response to performing the lesser number of stages without rectifying the error.

11. The method as recited in claim 1, wherein selecting the parameters of the error recovery procedure includes determining, based on the first and second information, that the error is most likely due to the apparatus; and selecting the parameters of the error recovery procedure from a predefined group of parameters designated for overcoming an error caused by the apparatus.

12. The method as recited in claim 1, wherein selecting the parameters of the error recovery procedure includes determining, based on the first and second information, that the error is most likely due to the data storage medium; and selecting the parameters of the error recovery procedure from a predefined group of parameters designated for overcoming an error caused by data storage media.

13. The method as recited in claim 1, wherein selecting the parameters of the error recovery procedure includes reordering a sequence of stages of the error recovery procedure.

14. The method as recited in claim 1, comprising performing the error recovery procedure using the selected parameters.

15. The method as recited in claim 1, wherein the apparatus is a tape drive, wherein the data storage medium is a magnetic recording tape.

16. The method as recited in claim 1, wherein the apparatus is an optical drive, wherein the data storage medium is an optical medium.

17. An apparatus, comprising:
a drive mechanism for passing a data storage medium over a transducer configured to perform data operations on the data storage medium; and
a controller electrically coupled to the transducer, the controller being configured to:
detect an error during performance of a data operation on the data storage medium; and
select parameters of an error recovery procedure based at least in part on:
(a) information about previous interactions between the apparatus and multiple data storage media, and (b) information about previous interactions between the data storage medium and other apparatuses.

18. The apparatus as recited in claim 17, wherein the information about previous interactions between the apparatus and multiple data storage media is stored on the apparatus, wherein the information about previous interactions between the data storage medium and other apparatuses is stored on and/or with the data storage medium.

19. The apparatus as recited in claim 17, wherein the information about previous interactions between the apparatus and multiple data storage media includes information about previous interactions between the apparatus and the data storage medium.

20. A computer program product for selecting parameters of an error recovery procedure, the computer program product comprising:
one or more non-transitory computer readable storage media, and program instructions collectively stored on the one or more non-transitory computer readable storage media, the program instructions comprising:
program instructions to detect an error during performance of a data operation on a data storage medium; and
program instructions to select parameters of an error recovery procedure based at least in part on: (a) information about previous interactions between an apparatus and multiple data storage media, and (b) information about previous interactions between the data storage medium and other apparatuses.

* * * * *